United States Patent Office 3,785,988
Patented Jan. 15, 1974

3,785,988
CORROSION AND SCALE INHIBITING
COMPOSITION
Yutaka Yamashita and Masami Sata, Tokyo, Japan, assignors to Kokusai Kasei Kosha Co., Ltd., Tokyo, Japan
No Drawing. Filed July 2, 1971, Ser. No. 159,501
Int. Cl. C02b 5/00
U.S. Cl. 252—181
9 Claims

ABSTRACT OF THE DISCLOSURE

An inhibitor for preventing formation of corrosion and scale on metals in the presence of water is formed of about 40% by weight hydrazine, about 25% maganese compound, about 15% zinc or zinc compound, about 15% silicon chlorine hydrogen compound, about 4% mineral oil, about 1% silver compound, and about 0.4% beryllium compound.

BACKGROUND OF THE INVENTION

Many known water additives are used for the purpose of removing corrosion and preventing deposition of scale from water equipment such as boilers, etc. Some known additives are intended to prevent scale and corrosion within tanks and pipes having inner surfaces. All known additives have drawbacks. Some simply do not work. Others require continual replenishment at repeated close intervals. Still others require very high ratios of additives to treated water. Ineffectiveness, continual replenishment and high volume requirements contribute inefficiency and high costs of known additives.

Hydrazine, when added to water, functions as a deoxidizer effective for preventing corrosion of a metal which is in contact with water, but used alone it must always be used in a quantity high in proportion to the water. Amine products were the next to be studied as an additive agent and this meant a further progress in the field of inhibitants. An additive agent of the amine family may coat the metal in contact with water and the addition of it once a week may suffice the requirement, but complete coating of the metal is not insured even by this agent since frequent addition is needed to attain the purpose.

DESCRIPTION OF THE INVENTION

This invention relates to an inhibitor for affording protection against corrosion and scales produced on the surface of metals such as iron or steel in the presence of water and more particularly on the surface of iron and steel receptacles for containing water, the inhibitor acting simultaneously as a deoxidizer for removing oxygen dissolved in the water, as a coagulator for coagulating the solid matter suspended in the water, and as an antimicrobial agent for preventing the growth of micro-organisms when applied to the metal container. The inhibitor provides an efficient coating on the surface of the metal in contact with water by forming an anti-corrosive and scale-avoiding layer which makes the metal surface highly resistant to corrosion and to adhesion of scales or to micro organisms.

The inhibitor of this invention is composed of hydrazine, a manganese compound, zinc or a zinc compound, a silicon chlorine hydrogen compound, a silver compound, a beryllium compound, and if desired, mineral oil, which are mixed in the following proportion:

| | Percent |
|---|---|
| Hydrazine | 20–60 |
| Manganese compound | 10–40 |
| Zinc or zinc compound | 5–20 |
| Silicon chlorine hydrogen compound | 5–20 |
| Silver compound | .5–1.5 |
| Beryllium compound | .2–0.8 |
| Mineral oil | 0–10 |

The inhibitor thus obtained is a muddy and dark colored material.

The most suitable manganese compounds for the purpose of this invention are manganese chloride ($MnCl_2$), manganese sulphate ($MnSO_4$), manganese oxide ($MnO$). Preferred zinc compounds are zinc chloride ($ZnCl_2$) and zinc sulphate ($ZnSO_4$). One example of a suitable silicon chlorine hydrogen compound is $Si_3H_5Cl_3$. There are many other compounds of varied proportions of Si, H, and Cl. Preferred silver compounds are silver halides, especially silver bromide. Beryllium oxide is the preferred beryllium compound. As a mineral oil, petroleum is appropriate, from which gasoline and kerosene may be used in the mixture.

When said materials are properly combined, they react and form a harmless composition. If they are combined with a mineral oil, the carbohydrate in the mineral oil produces amine compounds which serve to form a tough membrane resistant to corrosion by the aid of silicon compounds.

The inhibitor of the present invention not only acts as a drum cleaner, but can be used for preventing corrosion of metals in contact with a variety of waters such as natural water, city water, sea water, waste water of chemical plants and the like. The inhibitor of the invention also provides coagulation and anti-microbial effects.

The additive agent is capable of acting as a deoxidizer and simultaneously is able to coagulate and to precipitate the suspended matter in water, and to purify the metal container and to prevent the growth of micro-oranisms, and also is effective to resist corrosion of the metal surface. These effects are obtained by combining hydrazine with manganese compounds, zinc, or zinc compounds. The product thus obtained is effective and valuable, but the membrane produced has a drawback, being weak in adhesion like that of the amine additive agent as it could only coat the surface of the material. Moreover, such an additive has to be supplied frequently and proportionately to the quantity of the water. Silicon-chlorine-hydrogen compounds employed as an ingredient produce a tough membrane high in anti-corrosive properties and exceed properties of the amine family for coating the base metal contacting the water.

The silver and beryllium compounds strengthen the coating and promote its long durability and prevent corrosion. A precise understanding of the action of the silver and beryllium compounds is not necessary to the practice of this invention. However, it is believed that the compounds operate in the following manner. The silver compound cooperates and reacts with the remaining ingredients to form alloy membranes, tightening the coating, prolonging its life and preventing penetration of the water through the membrane to the metallic walls. The beryllium compound blends and/or reacts with other membrane components, coats the metal vessel material, and makes the metal uncorrosive.

A large quantity of the inhibitor is not required, and it can be added irrespective of the quantity of water to be treated. The addition may be made once in five months at a maximum concentration, as shown clearly by the experiment done under the same conditions as for an amine additive inhibiting agent.

The compounds obtained by this invention react with different kinds of water such as pure water, natural water, city water, sea water, waste water of factories and any other waters, and disperse and dissolve adhesions and clean the surface of the iron and steel or other surfaces in contact with the water, and prevent corrosion, adhesion of scales and slimes on the surface simultaneously.

While the manner in which the prevention of such corrosion and the formation of adhesions by producing a membrane on the surface of the metal is somewhat complicated and its understanding is unnecessary to using the invention, it may be explained as follows.

The inhibiting agent after being added to the water reacts completely in a few minutes but disperses and dissolves in the water in a uniform way, whereas the components of the agent act according to their nature when the metal surface contacts the solution of the agent. The main components of the membrane, presumed to be silicon compounds containing amine base, permeate into the oxidized layer and on the bare container metal and the layer under oxidation until the mixture reaches the non-oxidized layer. Upon reaching the bare non-oxidized base metal, the components form a tough and corrosion resistant membrane consisting of nitrogen, hydrogen, silicon, carbon, manganese, zinc, silver and beryllium chlorine, bromine and oxygen. The oxidized layer is destroyed by the components of the agent.

This destructive action brings about purification of the metal surface, but it does not form the main membrane after purification. The main components for forming the membrane immediately penetrate into the layer under oxidation, passing through the first layer and then forming thereunder a membrane on the next layer. The time needed for the formation of the membrane is normally regarded as 1 to 3 hours, depending on the progress of the layer oxidation, whereas destruction of the oxidized layer or the layer to be oxidized is made over a very long time, i.e. over a period of 40 to 50 days. Needless to say, the time may be shortened if the metal surface is subjected to pickling, grinding or pre-cleaning.

The material which has been destroyed turns into soft mud and gathers at the bottom of the container by the effect of coagulation and precipitation of the inhibiting agent. The main membrane is formed before destruction of the oxidized layer is finished, because the components of the membrane are strong in affinity for the metal, but very weak in affinity for oxygen. Hitherto known corrosion resistant membranes were formed without regard to the purification or oxidation of the underlayer and therefore it was not possible to obtain a tough membrane. The membrane obtained by the present agent is formed on a pure and sound under-layer.

As has been previously described, the components of the main membrane repel oxygen and repel dissolved oxygen in the water. The coating has strong affinity with negative hydroxide ions, so that OH— migrates with the components of the main membrane. OH— gives negative charge to the metal surface through the main membrane and is isolated and fixed thereon and the metal thereunder is negatively charged.

This main membrane has a strong affinity with $Ca^{++}$ which migrates with the main membrane components and is fixed thereon, taking a positive charge and isolated as Ca. This Ca forms a subsidiary membrane on the main membrane together with isolated OH. The subsidiary membrane is not a compound such as $Ca(OH)_2$, as is evident from the fact that it is stable even though the water is acidified. The subsidiary membrane is soft in quality, fixed well on the main membrane and easily taken off. Thus, when the inhibiting agent is added, the double membrane separates and intercepts the corrosive materials from the metal surface and thereby results in a corrosion preventive effect. Further, it is believed when OH— in the water is fixed on the metal surface with the main membrane, the negative electrical charge obstructs the progress of effluence of metal by $H^+$ and produces a corrosion preventive effect.

Other effects and advantages of the subsidiary membrane are as follows:

The subsidiary membrane thus obtained is of slag-like material, so the inorganic components do not stick to the inner wall of a container which may be a boiler or pipe, but are repelled by it. The subsidiary membrane obstructs the adhesion of inorganic compounds and organic slime on the wall. Therefore, when the inhibiting agent is applied in the boiler, scales do not cover the inner wall or any part of the cooling pipe. Organic slime does not stick on the container wall. The inhibiting agent of this invention is a very effective anti-corrosive and is a material which prevents adhesion of deposits on the metal surface.

The double membrane can withstand any kind of water at a temperature under 650° C. and is stable for more than one month. As it has specific properties not obstructing heat transmission, it is suitable for application in cooling pipes.

Hydrazine, manganese compounds, zinc or zinc compounds act on the water and form a flocculation of coagulative nature by reacting with the water and precipitate scale forming compounds and thus prevent adhesion of scales on the iron and steel or other metal surfaces. Further, the inhibiting agent according to this invention intercepts the supply of oxygen necessary for the growth of many micro-organisms by its deoxydizing action and destroys them. Micro-organism may be destroyed by the employment of this agent.

Example 1

Hydrolytic hydrazine 50% by weight, 24% manganese chloride, 10% zinc, silicon compounds (main components $Si_3H_5Cl_3$), 9%, 1% silver bromide and 0.7% beryllium oxide and 5% kerosene are mixed and stirred at 20° to 70° C. The materials become gray in color and muddy. The mixture is then left to cool.

Example 2

The inhibitor of Example 1 is added to the water contained in a drum in a proportion of 1 ton of city water to 70 g. of inhibitor. A polished mild iron plate is suspended therein at the rate of 13 g. per square meter (weight of inhibitor/surface area of the mild iron plate) and left for three hours and then is transferred to a drum filled with pure water. The test is repeated every seven days. In the first one to two months, corrosion increases. Surface cleaning is in progress. The iron plate is taken out after six months, whereupon a silver-white alloy layer is seen adhered to the whole surface. The alloy layer has a thickness of about 10 microns. There is no trace of corrosion.

Example 3

An iron plate similarly treated as in Example 2 is immersed in sea water. Time and corrosion are observed. The same result as in Example 2 is obtained.

Example 4

An iron plate treated as in Example 2 is dipped in a solution of calcium chloride, density 20%, at —20° C. Results are obtained as in Examples 3 and 2.

Example 5

A boiler supplied with city water is washed inside by pickling and then cleaned. The inhibiting agent produced as in Example 1 is added once a week in a quantity of 10 g. per square meter of heat transmission area. After two months, the boiler is opened. A viscous soft rust-colored mud is found coating the whole inner wall of the boiler, and a pool of soft mud is found at the bottom of the vessel. If the rust-colored mud is removed, the whole inner wall of the boiler presents a black color. Six months later, the boiler is opened. There is found a slag-like, thin membrane of gray color coating the inner wall surface. If this membrane is removed, a silver-white alloy layer is seen.

Example 6

The inhibiting agent is added to a cooler at the rate of 10 g. per square meter of heat transmission area at first every 7 days, then 8 g. is added once a month for a period of six months. The water is in circulation. After six months, there is found an overall membrane on the pipe and inner wall surface. Slime, dirt or rust deposits on the membrane, but corrosion is not apparent at all.

Example 7

To 1 ton of city water at 18° C. is added 70 g. of the inhibiting agent made by the method as in Example 1. Residual oxygen initially of 7.63 p.p.m. decreases to 0.42 p.p.m. in 20 minutes. Residual oxygen is measured by the JIS Winkler method.

Example 8

1 liter of waste water from a dye-works is put into a measuring cylinder, to which is added the inhibitor according to the process employed in the previous example. There is seen to be flocculation formed in the water by the addition of the inhibitor. After 5 minutes pass, there is obtained about 800 cc. of clean water. In this case, however, a little more inhibitor is applied.

Example 9

Growing algae is added to water containing the inhibitor, which is present in the water in an amount of 60 mg. to the liter of water. The color changes, and after two days, the growth suspends completely. Three kinds of iron bacteria are taken out and added to this inhibitor. Although examined by the microscope, no cellular structure is recognized. Later the growth stops completely.

Example 10

The additive as prepared in Example 1 is used continuously for five years in a new water tube boiler having a heating surface of approximately 99 square meters and an operating pressure of 12 kilograms per square centimeter. The quantity of water in the boiler is about five tons. The feed water is 100% softened water, ranging over a five year period from 7.60 to 8.09 pH. Methyl orange alkalinity tests show between 25–46 p.p.m. as calcium carbonate. Chlorides present range from about 6.34;16.19 p.p.m. Electrical conductivity is about 110–171 mv./cm.

Once a week for ten weeks, and then once a month, a 2 kg. quantity of the inhibitor is added, producing a concentration of about 20 g. per square meter of treated surface or about 400 p.p.m. The additive is put in the boilers on Saturay, and boiler operation is suspended for about 30–36 hours after the addition. No other agents are parallelly used, with the exception that in the last year of the test, sodium hydroxide is added.

One year after initial treatment, no stuck-on scales are found on the surface. On the inner surface of the upper and lower drums, the surface has a reddish-brown color. The inner surface of the water tubes is fully covered with adhesive brown lumps. Removal of the lumps turns the surface into black. A little milk-white pasty material is at the bottom of the drums. No trace of pitting is observed either in the drums or in the water tubes.

Two years after initial treatment, no scales are observed on the drums. Although there are some adhesive lumps on the surface of the drums, they are easily removed by brush. Some thin sticky materials are on the surface. The sticky materials are removed by a wet towel, and the surface present a black color. However, no gloss appears on the surface. Corrosion neither developed nor increased.

Three years after initial treatment, no soft pasty materials or scales are observed in the drums or in the water tubes. On the welded part of the central surface area of the water tubes. On the welded part of the central surface area of the upper drum there is observed a rust-like lump 20 cm. long and about .5 mm. deep. That is a phenomenon of step-by-step collapsing of the suboxidized layer. The surface became completely free of any signs of corrosion.

Four to six years after initial treatment, inner surfaces of the upper and lower drums and surfaces of water tubes present a little brown color. That color is easily washed away by water, and surfaces turn out to be pasty and black. Under an electric light, the surfaces look glossy. No development of corrosion is observed. Official boiler inspectors expressed amazement when examining the status of the treated boilers. A part of the drum is washed with thin acid, and the surface presents a unique glossy appearance.

A one year old boiler had been treated for the first year by standard commercial boiler compounds. The boiler was a water tube boiler having a capacity of about six and one-half tons of water with a heating surface of approximately 135 square meters and an operating pressure of about kg. per square centimeter of about 12.

Water used had about the same consistency as water used in Example 10, with a slightly higher impurity content and a conductivity of about 246 μv. per square centimeter. Although a deaerator had been used and a boiler compound had been added, oxygen remained in the water and signs of corrosion were observed. In treating the water with the present additive, 1.5 kilograms per treatment were used, representing 11 grams per square meter of heating surface. The additions were made on Saturdays and holidays and boiler operation was suspended for about one day after treatment. For the first eight weeks, the membrane forming inhibitor was added once a week. Thereafter, it was added about once a month for a period of about four years.

Six months after the initial treatment, the inner surface of the drum was reddish brown. Red rust-colored lumps were observed in several places. At first glance, these lumps suggested pitching. However, they could easily be removed by brushing. For approximately two months after the initial treatment, the blow water showed a rusty color. Gradually, it turned thinner.

One year after initial treatment, the rust-like lumps on the inner surface were harder than when first checked after the initial six months of application. When the lumps were removed, the metal surface became flat black and showed no signs of pitching.

After two years, the rust-like lumps were no longer observed. Reddish-brown sludge appeared on the inner surface of the drum. At some places of the inner surfaces of the water tubes, there appeared a newly formed alloy layer of an oxidized silver color.

After three years, the amount of reddish-brown sludge on the inner surface decreased, the surface became black and glossy. In some places the oxidized silver colored new alloy layer began to appear. The surface became completely free of any signs of corrosion. After four years, only a small amount of sludge remained on the drum surface. This was easily removed by hosing, and there appeared a surface of a mixture of glossy black and oxidized silver colors. There existed no signs of corrosion.

Example 11

Well water is used as cooling water for a cooling tower. Slimes seriously blocked condensors before using present additives. The exact water-touching surface area of the cooling tower was not known. The new inhibitor was added weekly and then monthly in two kilogram lots. The rate of 300 p.p.m. is estimated. Several minutes after commencement of use of the present compound, the attached slimes turned to brown flocs and started flowing into the circulating cooling water. Later, the cooling water was drained completely, and fresh water was put into the tower. As the operation continued, no further slimes were noted and the condensors maintained the desired pressures.

Example 12

The above tests are repeated using 60% by weight hydrazine, 10% manganese chloride, 5% zinc chloride, 15% silicone compounds, 9% mineral oil, about 1% silver salt, for example silver halides, and less than 1% beryllium compound, for example, beryllium oxide. Results identical to the results in the previous examples were noted.

Example 13

The previous Examples 2–12 are conducted using 20% by weight hydrazine, 40% by weight manganese compound, 20% by weight silicone compound, 19% zinc compound, about ½% silver compound and about ½% beryllium compound. Substantially identical results were obtained.

Example 14

Examples 2–12 were repeated using ranges of compounds similar to those described in Examples 1, 13 and 14, with the exception that the beryllium compound was omitted. Slightly more corrosion was noted.

Example 15

Examples 2–12 are repeated using compounds similar to those described in Examples 1, 13 and 14, but omitting the silver compound. The results are similar, but the membranes are slightly less hard or less dense.

Example 16

Examples 2–12 are repeated, using the compositions of Examples 1, 13, 14 and the two previous Examples 14 and 15. With the exceptions that the manganese and zinc compounds were replaced by similar chromium, cadmium, tin, strontium, and tantalum, results siimlar to the results in the previous examples were noted.

Example 17

Test pieces of common rolled steel plate are prepared having thickness more than 3.2 mm. Fats and oils on the surface are cleaned away by NaOH. Mill-scales are completely removed. A composition of Example 17 is prepared and is evenly spread on the surface of the steel in dry areas. Within 3 to 5 days, under wet conditions, the composition is washed away. Seven days later, the composition is spread on again. The spreading will be repeated ten times. Then, test pieces will be immersed in a 1.3% commercial mill-scale removing solution. They are kept in the solution for one to two hours. After the surfaces of the test pieces are cleaned, they are put in water. That operation is carried out five times every other ten days.

The above treated test pieces and similar non-treated steel pieces, from which mill-scales have been removed, are placed in comparison tests under the same conditions.

The anti-corrosion properties of the composition is confirmed through the above comparison tests.

Example 18

The process of a water solution treatment is the same as the previous treatment except for the following points.

A solution with concentration of 200 p.p.m. is made. The test pieces are immersed in the solution with the rate of 13 g./m.². Every seven days the above solution is renewed. The surfaces of the test pieces are washed, and they are immersed again. This process is repeated 30 times. Then, test pieces are immersed in the 1.3% commercial scale-removing solution and are left for one to two hours. After the surfaces of the test pieces are cleaned, they are put in water.

The above process confirms the anti-corrosion effects.

While the invention has been particularly shown and described with reference to a preferred embodiment thereof, it will be understood by those skilled in the art that various changes in form and details may be made therein without departing from the spirit and scope of the invention.

What is claimed is:

1. A composition for preventing corrosion and scale formation on metallic surfaces in contact with water comprising a composition having about 20%–60% hydrazine, 15%–60% material selected from the group of metals and metal compounds consisting of zinc, manganese, chromium, cadmium, tin, strontium, tantalum, and compounds thereof, 5%–20% silicon-chlorine-hydrogen compound and about ½%–3% material selected from the group of metals and metal compounds consisting of silver, beryllium, and compounds thereof.

2. The composition of claim 1 wherein the from about ½%–3% material comprises about 1% silver halide and about 0.4% beryllium compound.

3. The composition of claim 2 wherein the silver halide comprises silver bromide and wherein the beryllium compound comprises beryllium oxide.

4. The composition of claim 1 wherein the 15%–60% material comprises 10%–40% manganese compounds and 5%–20% zinc and zinc compounds.

5. The composition of claim 1 wherein the 15%–60% material comprises 10%–40% manganese compound and 5%–20% zinc or zinc compound, wherein the silicone compound comprises silicone-chlorine-hydrogen compound, and wherein the ½%–3% material comprises about 1% silver halide and about 0.4% beryllium oxide.

6. The composition of claim 5 wherein the silver halide comprises silver bromide.

7. The composition of claim 1 further comprising up to 5% mineral oil.

8. The process of protecting the metal surfaces of water tanks and boilers from corrosion comprising treating said metal surfaces with water containing the composition of claim 1.

9. The process of protecting metal from corrosion by coating the metal with a coating comprising the composition of claim 1.

References Cited

UNITED STATES PATENTS

| | | | |
|---|---|---|---|
| 2,936,289 | 5/1960 | Harshman et al. | 252—181 |
| 3,423,312 | 1/1969 | Blaisdell et al. | 252—181 X |
| 2,785,136 | 3/1957 | Colarusso | 252—181 X |
| 3,019,195 | 1/1962 | Denman et al. | 252—181 X |
| 3,256,203 | 6/1966 | Robertson et al. | 252—181 X |
| 3,639,263 | 2/1972 | Troscinski et al. | 252—181 X |

NORMAN G. TORCHIN, Primary Examiner

J. R. MILLER, Assistant Examiner

U.S. Cl. X.R.

21—2.7 R, 117; 210—64; 252—87